(12) United States Patent
Chen et al.

(10) Patent No.: US 8,898,600 B2
(45) Date of Patent: Nov. 25, 2014

(54) LAYOUT OPTIMIZATION FOR INTEGRATED DESIGN

(71) Applicant: Taiwan Semiconductor Manufacturing Company, Ltd., Hsin-Chu (TW)

(72) Inventors: Huang-Yu Chen, Zhudong Township (TW); Yuan-Te Hou, Hsinchu (TW); Yu-Hsiang Kao, Hsinchu (TW); Ken-Hsien Hsieh, Taipei (TW); Ru-Gun Liu, Zhubei (TW); Lee-Chung Lu, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/941,941

(22) Filed: Jul. 15, 2013

(65) Prior Publication Data
US 2014/0282306 A1     Sep. 18, 2014

Related U.S. Application Data
(60) Provisional application No. 61/794,037, filed on Mar. 15, 2013.

(51) Int. Cl.
*G06F 17/50* (2006.01)
(52) U.S. Cl.
CPC .............................. *G06F 17/5072* (2013.01)
USPC .................. 716/55; 716/51; 716/52; 716/53; 716/54

(58) Field of Classification Search
USPC .............................. 716/50, 51, 52, 53, 54, 55
See application file for complete search history.

(56) References Cited

U.S. PATENT DOCUMENTS

| | | | |
|---|---|---|---|
| 5,619,420 A | 4/1997 | Bried | |
| 7,761,824 B2* | 7/2010 | Chew et al. | 716/106 |
| 8,146,025 B2* | 3/2012 | Yang et al. | 716/52 |
| 8,151,234 B2* | 4/2012 | Berkens et al. | 716/119 |
| 8,196,068 B2* | 6/2012 | Zhang | 716/53 |
| 2008/0222587 A1* | 9/2008 | Smayling et al. | 716/7 |
| 2008/0301623 A1* | 12/2008 | Tsai et al. | 716/21 |
| 2010/0050149 A1* | 2/2010 | Cote et al. | 716/21 |
| 2011/0185329 A1* | 7/2011 | Wen et al. | 716/130 |
| 2013/0246981 A1* | 9/2013 | Chiang et al. | 716/53 |
| 2013/0322736 A1* | 12/2013 | Yu et al. | 382/149 |
| 2014/0001564 A1* | 1/2014 | Song et al. | 257/369 |

* cited by examiner

*Primary Examiner* — Thuan Do
*Assistant Examiner* — Brian Ngo
(74) *Attorney, Agent, or Firm* — Haynes and Boone, LLP

(57) ABSTRACT

A method for laying out a target pattern includes assigning a keep-out zone to an end of a first feature within a target pattern, and positioning other features such that ends of the other features of the target pattern do not have an end within the keep-out zone. The target pattern is to be formed with a corresponding main feature and cut pattern.

19 Claims, 6 Drawing Sheets

LAYOUT OPTIMIZATION FOR INTEGRATED DESIGN

This application claims the benefit of U.S. Provisional Application No. 61/794,037 entitled "Layout Optimization for Integrated Circuit Design" file Mar. 15, 2013, herein incorporated by reference in its entirety.

BACKGROUND

Multiple patterning is a technique used in photolithographic processes to allow for greater feature density. When fabricating integrated circuits, various features such as metal lines are formed into a semiconductor substrate. To form these features, photo-masks are used to form a pattern into a photo-resist layer. For example, the regions where the photo-resist layer is removed expose the underlying substrate to an etching process used to form trenches where metal is subsequently placed.

As the patterns formed into photo-resist layers become increasingly dense, it becomes difficult to use a single photo-mask to form a pattern in the photo-resist layer because features within the nanometer range are relatively small, as compared to the resolution of a light source to which the photo-resist layer is exposed. Thus, multiple masks may be used to form the features within a pattern. Specifically, each of the multiple masks is used to create different features within the target pattern.

In some cases, a cut pattern is used in association with a main pattern to form a target pattern. The cut pattern removes features formed by the main pattern in order to achieve the desired target pattern. Using such techniques provides certain advantages to the photolithographic process. For example, it is desirable to have a large process window. The process window refers to a range of focus and exposure settings that will still produce the desired features into the photo-resist layer. A process window can be improved by keeping features within a pattern relatively uniform in density. This may involve placement of "dummy" features in or near the pattern. Dummy features are extra features that are placed in order to maintain feature density, but may not serve any function within the circuit for which the pattern is designed. To separate dummy features from real features and to create the desired pattern, a cut mask is used.

Placement of the cut features within the cut feature mask is an important consideration. If two cut features are too close to each other, then it can be difficult to form the cut features properly. Moreover, the cut features may adversely affect adjacent features. Thus, it is beneficial to consider the placement of cut features when designing a layout for a target pattern.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
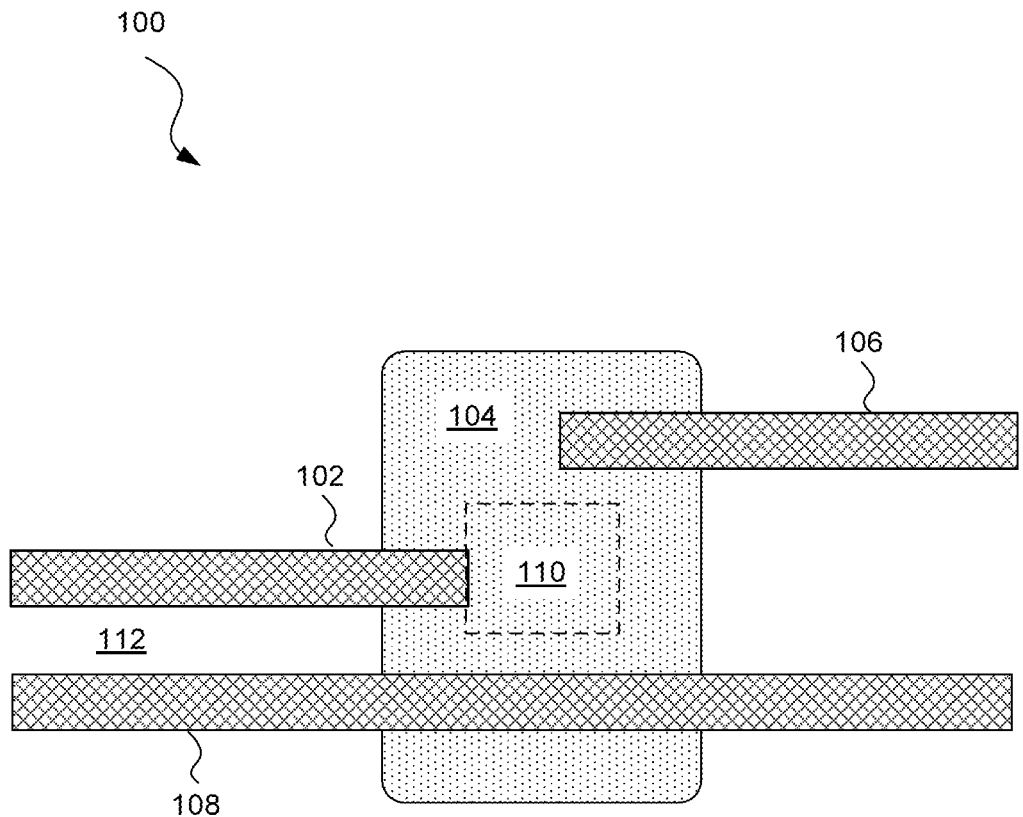
FIG. 1 is a diagram showing an illustrative keep-out zone assigned to a cut feature, according to one example of principles described herein.

FIG. 1 is a diagram showing an example target pattern 100 for an integrated circuit (IC) layout. The target pattern 100 includes a number of target features 102, 106, 108. The target features may be, for example, metal lines. Because the target pattern will use a combination of a main pattern and a cut pattern, it is presumed that ends of the features will be formed by a cut feature 110.

The diagram also shows a keep-out zone 104 that is associated with the end of the feature 102. The keep-out zone 104 places limits on nearby features. Specifically, the feature 106 is not "allowed" to end within the keep-out zone 104. The keep-out zone 104 does, however, allow a feature 108 to pass through, as long as that feature 108 does not have an end within the keep-out zone 104. This is because ends of other features will presumably be formed with a cut feature. Thus, to allow an end within the keep-out zone 104 will potentially allow two cut features to be formed too close to each other.

The main pattern and cut pattern may be formed in a variety of methods. In one example, the main pattern is formed into a photo-resist layer by exposing the photo-resist layer to a light source through a photo-mask. In one example, the photo-resist material may be a negative photo-resist material. In such a material, the regions exposed to light become insoluble to the photo-resist developer. The photo-resist material where features are to be formed should become soluble to a developing solution and thus the photo-mask blocks such regions from exposure. The insoluble regions of the photo-resist material remain to protect the underlying layer from an etching process used to form the features into the underlying layer.

As mentioned above, a main pattern may be subject to restricted design rules. These restricted design rules may be a variety of constraints that take into consideration the overall density of the pattern. For example, a restricted design rule layout may require the pattern to consist of a series of target features in parallel, and a set distance apart from each other. In order to create the final circuit from these features, a cut feature mask is used to expose cut features into the pattern that cut up the main features. Cutting the main features separates real features from the dummy features. Real features are those that serve a function in the circuit to be created by the pattern. For example, if the features are metal lines, then real features may carry electrical signals.

When using a negative photo-resist, the cut mask may expose regions that have not yet been exposed. Thus, the main mask exposes all the regions around the intended main features to the light source in order to make those regions 112 insoluble. Likewise, the cut feature mask exposes regions of the photo-resist layer that are to become insoluble, and thus "cuts" the target features formed by the target feature mask.

In another example, a first photo-resist layer is used to expose an underlying hard mask material to an etching process that forms the main features. A second photo-resist layer is then used to form the cut features into the hard mask. The hard mask then represents the target pattern that can be transferred to the underlying substrate. In some examples, the cut features may be formed before the main features and more than one hard mask material may be used.

As mentioned above, it is important that the cut features within the cut mask follow certain rules. For example, the cut features should not be too close to each other. Thus, when designing a target pattern and a corresponding main pattern and cut pattern, it is important to take those rules into account. This is done by defining a keep-out zone for each cut feature that "keeps out" only ends of other target features. The keep-out zone keeps out other feature ends because presumably other feature ends are created through use of another cut feature. Thus, by keeping other feature ends out of the keep-out zone, it can be ensured that no other cut features come close to another cut feature. By being concerned with feature ends and not features altogether, the keep-out zones 104 allow features 108 to pass through as long as those features 108 do not "stop" within the keep-out zone.

In the example of FIG. 1, one feature 106 does not meet the keep-out zone rule. Specifically, the feature 106 ends in the keep-out zone. If this situation occurs during the pattern layout, then the layout is adjusted in order to avoid such a keep-out zone violation.

Figure 2A:
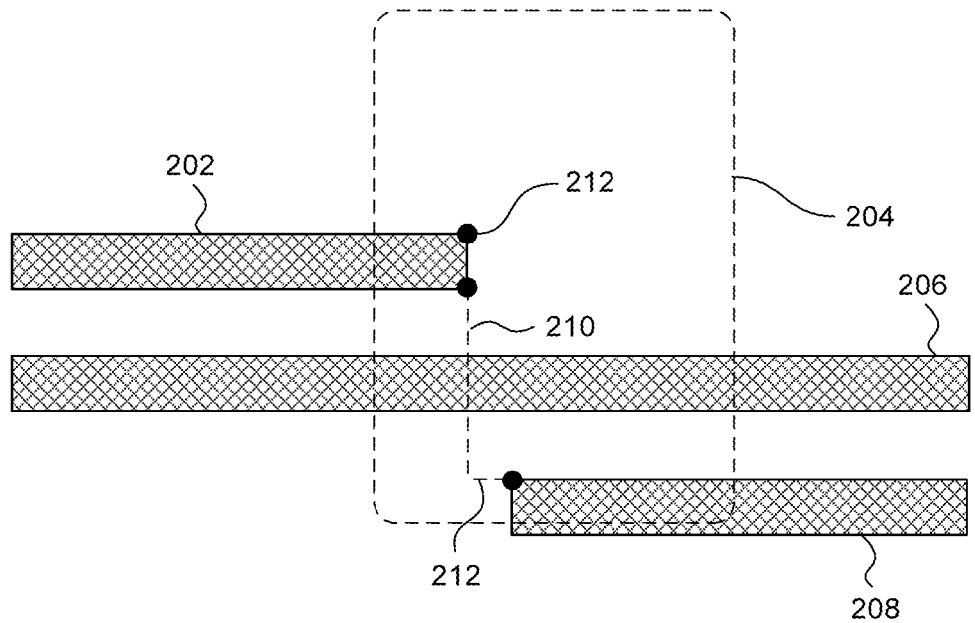
FIG. 2A is a diagram showing an illustrative method of using corners to determine whether features end within the keep-out zone, according to one example of principles described herein.

FIG. 2A is a diagram showing an illustrative method of using corners to determine whether features 202, 206, and/or 208 end within a keep-out zone 204. During the layout of a target pattern, various mechanisms by which to determine if a feature violates a keep-out zone rule may be used. In one example, corners 212 of the features can be used to determine if a feature violates the keep-out zone 204.

In the case where the keep-out zone is substantially rectangular in shape, such as is shown in FIG. 2A, it can be determined if a feature violates the keep-out zone 204 by the distance between corners 212. Specifically, the distance between a first feature 202 associated with the keep-out zone 204 and the corner of another feature 208 can be measured. Both the vertical distance 210 and the horizontal distance 212 can be used to determine whether the second feature 208 is within the keep-out zone 204. In the example of FIG. 2A, the corner of the second feature 208 is within the keep-out zone 204. Thus, such a layout would have to be adjusted in order to comply with the keep-out zone rules. The intermediate feature 206, however, does not have an end within the keep-out zone and is not problematic.

Figure 2B:
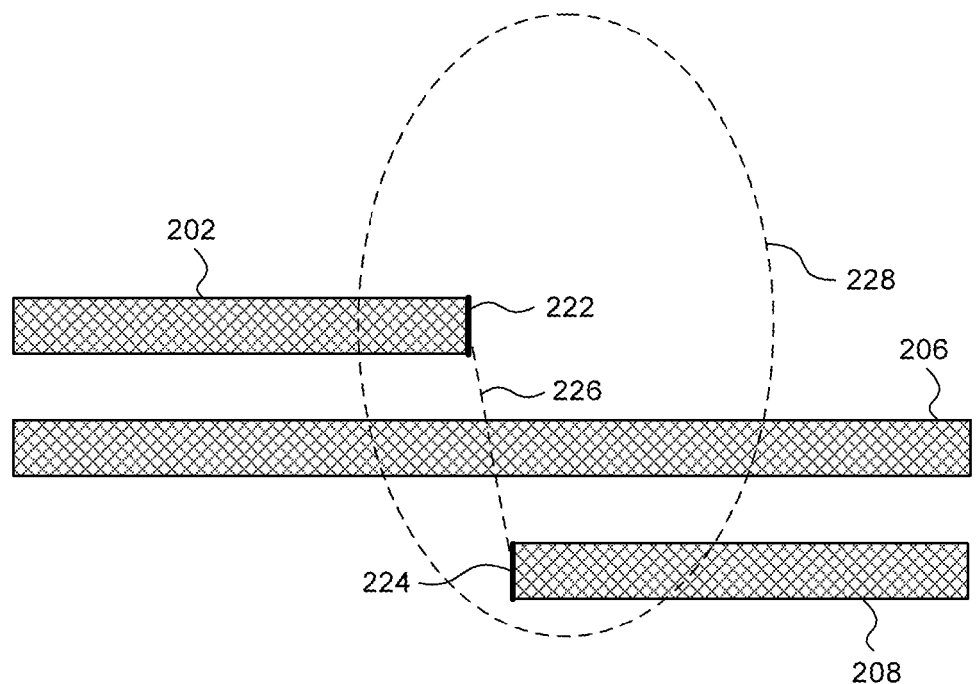
FIG. 2B is a diagram showing an illustrative method of using edges to determine whether features end within the keep-out zone, according to one example of principles described herein.

FIG. 2B is a diagram showing an illustrative method of using edges to determine whether features end within the keep-out zone 228. In this example, the keep-out zone 228 is elliptically shaped. In some examples, however, the keep-out zone may be square, rectangular, or circular.

To determine whether any features end within the keep-out zone, an edge-to-edge distance may be measured. Using the direction and distance 226 from the edge 222 of the first feature 202 and the edge 224 of the second feature 208, it can be determined whether the end of the second feature 208 ends within the keep-out zone 228. The distance may be from the center of one edge 222 to the center of the other edge 224.

The examples given above for determining whether a feature ends within a keep-out zone are only a few methods that may be used. Various other mechanisms for determining whether a feature is in violation of a keep-out zone may be used. Moreover, an actual layout will have several keep-out zones.

In some examples, a keep-out zone is associated with every feature where it is intended to be cut by a cut feature. It may be the case that several iterations of adjustments occur during the layout phase in order to have a layout in which no feature ends are positioned within keep-out zones. In some cases, the layout may be designed feature-by-feature and thus each newly placed feature will be placed in a manner so as to avoid having edges within a keep-out zone.

Figure 3A:
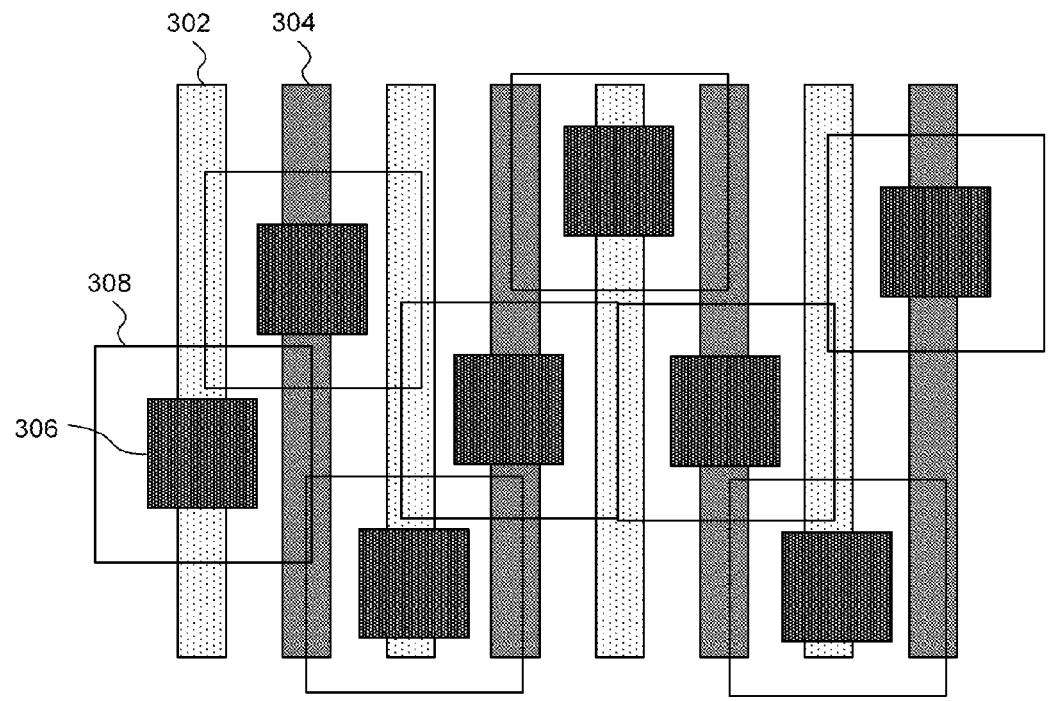
FIG. 3A is a diagram showing an illustrative cut pattern over a main pattern, according to one example of principles described herein.

FIG. 3A is a diagram showing an illustrative cut pattern over a main pattern. The main pattern is designed to be process efficient. Specifically, the main pattern is designed to have a larger process window by adding extra features to maintain a uniform density. The cut pattern, however, is designed to use cut features 306 so that when overlain with the main pattern, creates the target pattern. As mentioned above, it is desirable that the cut features be not too close together. Thus, a keep out zone 308 is associated with each feature end.

The keep-out zones 308 are designed with consideration of the cut features that will be used to form those line ends. Specifically, the keep-out zones may be centered on where the cut features are to be placed. The placement of the cut features can be determined by the feature ends.

In some examples, the main pattern can be formed using multiple patterning techniques. For example, some features 302 may be formed with a first mask while other features 304 may be formed with a second mask. Various techniques which use multiple masks to form the main pattern may be used. Such techniques include, but are not limited to, multiple patterning, self-aligned multiple patterning and self-directed assembly.

Figure 3B:
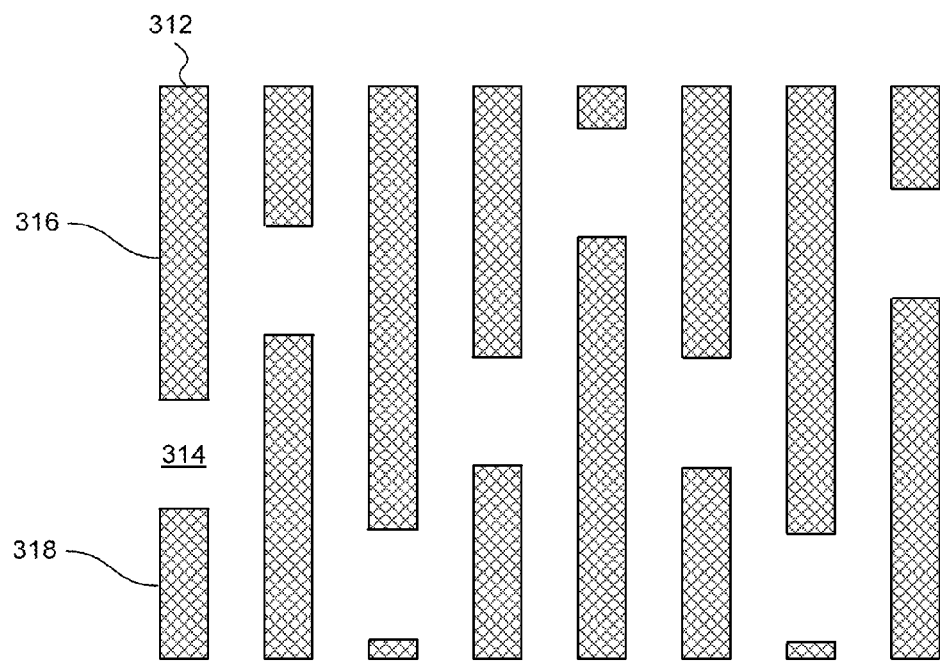
FIG. 3B is a diagram showing an illustrative target pattern formed from the main pattern and cut pattern, according to one example of principles described herein.

FIG. 3B is a diagram showing an illustrative target pattern formed from the main pattern and cut pattern. If the target pattern is designed appropriately with the keep-out zones associated with the ends of the real features, then the cut pattern will be designed appropriately without the cut features being too close together. Moreover, the desired function of the target pattern will still be present within the final pattern. The target pattern includes spaces 314 that are to be formed with cut features. A space 314 may separate a real feature 316 from a dummy feature 318.

Figure 4:
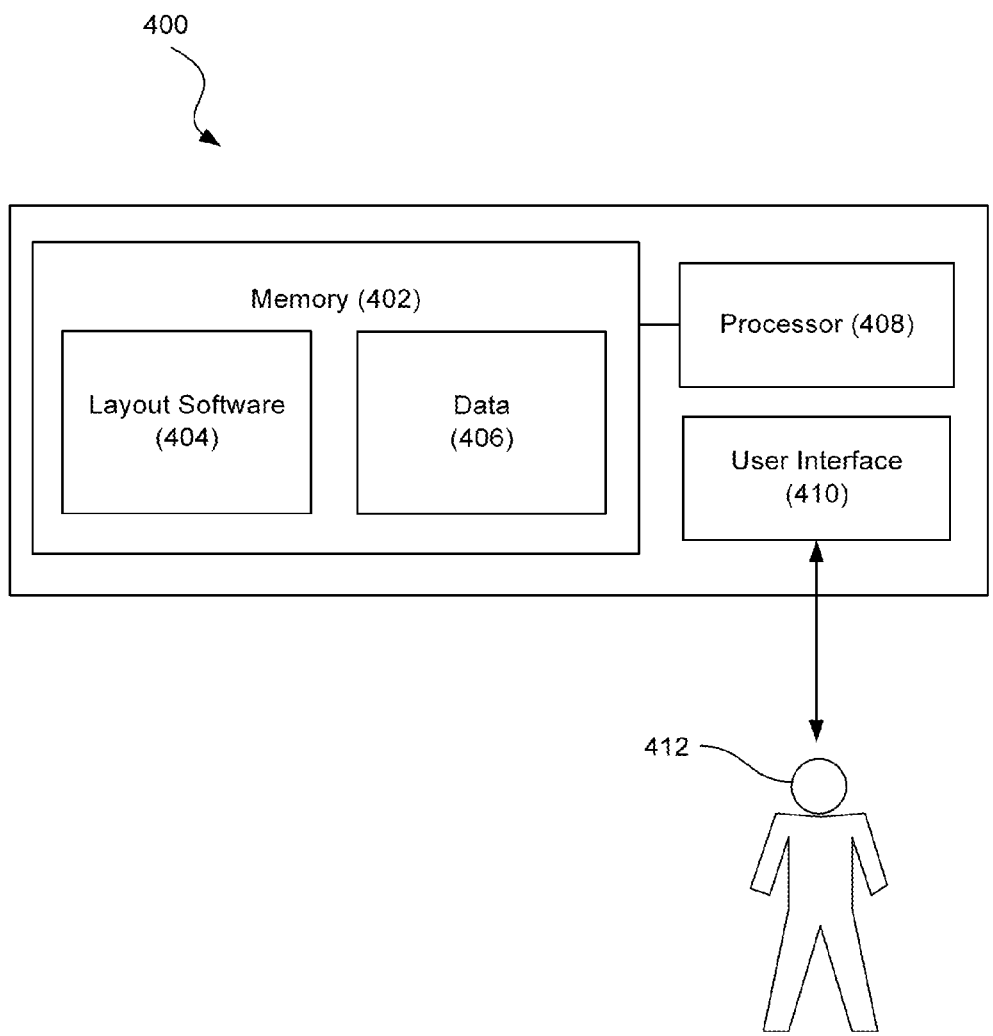
FIG. 4 is a diagram showing an illustrative computing system for laying out patterns, according to one example of principles described herein.

FIG. 4 is a diagram showing an illustrative computing system for laying out patterns. According to certain illustrative examples, the physical computing system 400 includes a memory 402 having layout software 404 and data 406 stored thereon. The physical computing system 400 also includes a processor 408 and a user interface 410.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 404 and data 406.

The physical computing system 400 also includes a processor 408 for executing the software 404 and using or updating the data 406 stored in memory 402. In addition to storing the layout software 404, the memory 402 may store an operating system. An operating system allows other applications to interact properly with the hardware of the physical computing system. The layout software 404 may include the tools to form final pattern layouts as well as main pattern layouts and cut pattern layouts.

A user interface 410 may provide a means for a user 412 to interact with the system. The user may use various tools such as a keyboard or a mouse to input information into the physical computing system. Additionally, various output devices such as a monitor may be used to provide information to the user 412.

Figure 5:
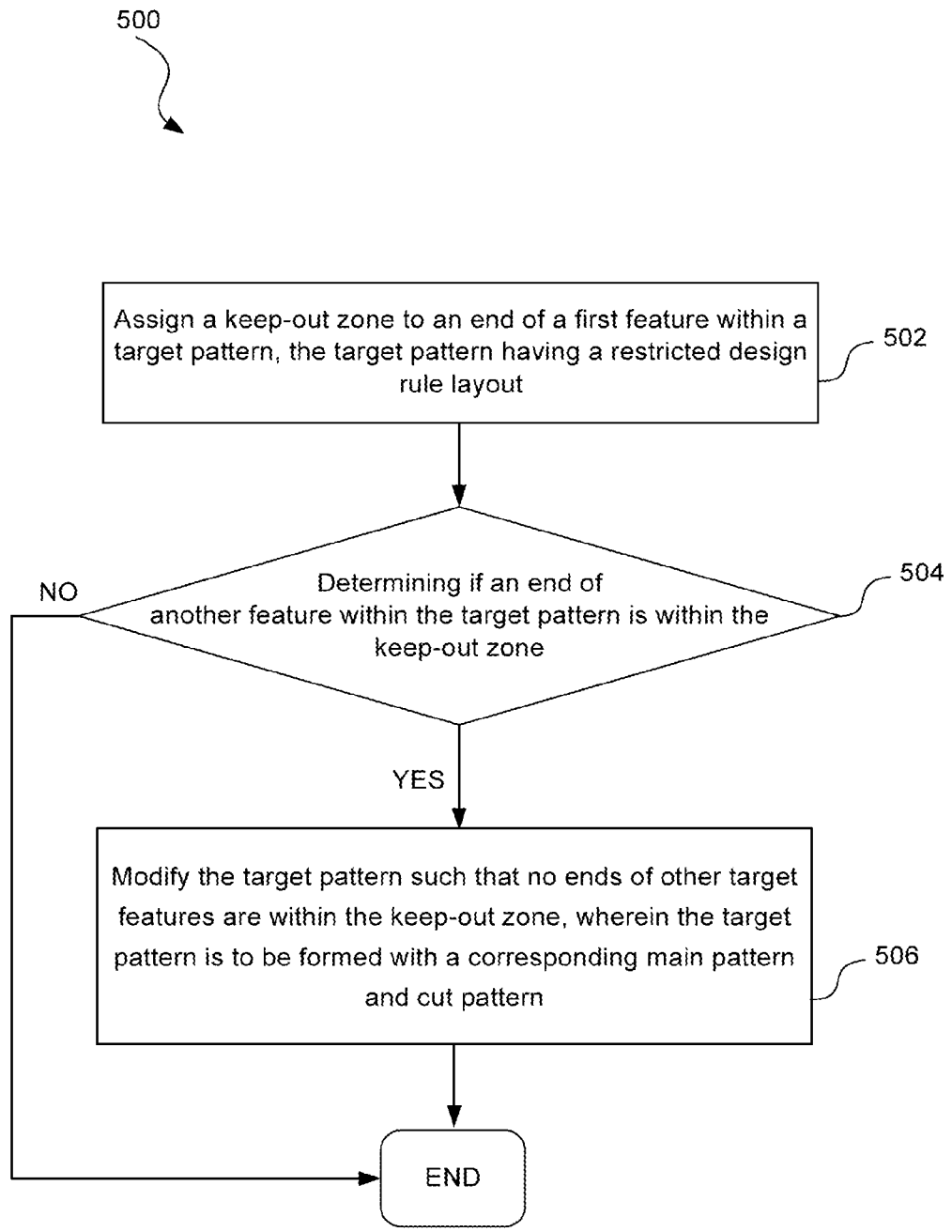
FIG. 5 is a flowchart showing an illustrative method for adjusting a pattern layout so that feature ends are not positioned within keep-out zones, according to one example of principles described herein.

FIG. 5 is a flowchart showing an illustrative method for adjusting a pattern layout so that feature ends are not positioned within keep-out zones. The method includes a step for assigning 502 a keep-out zone to an end of a first feature within a target pattern, the target pattern having a restricted design rule layout. The method further includes a step for determining 504 if an end of another feature within the target pattern is within the keep-out zone. If the end of another feature within the target pattern is within the keep-out zone, then the method further includes a step for modifying 506 the target pattern such that no ends of other features are within the keep-out zone. The target pattern is to be formed with a corresponding main pattern and cut pattern.

Figure 6:
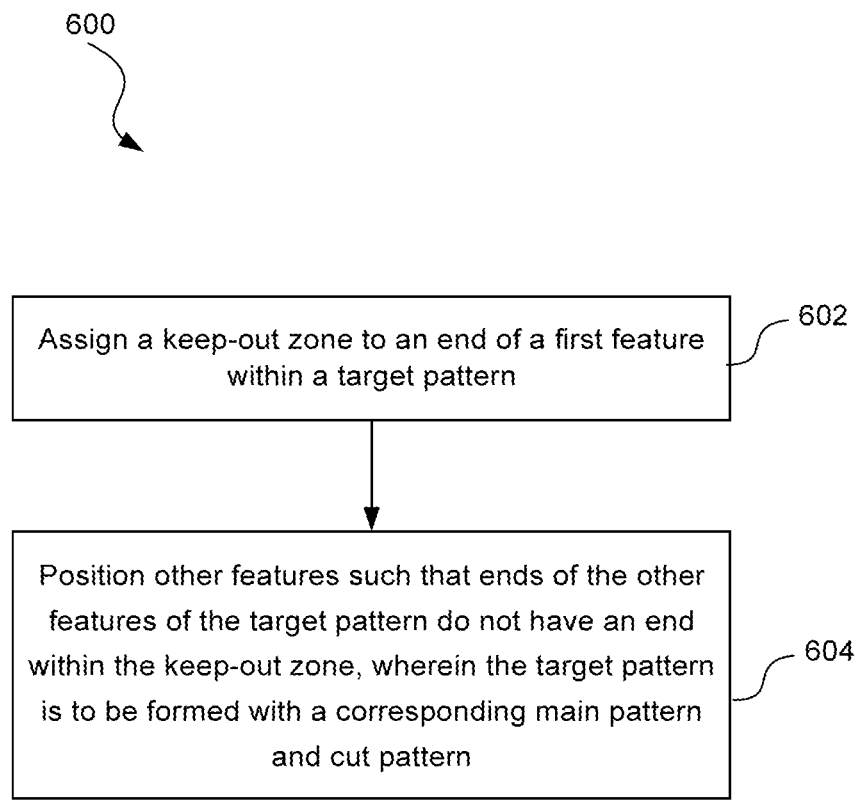
FIG. 6 is a flowchart showing an illustrative method for laying out a pattern so that feature ends are not positioned within keep-out zones, according to one example of principles described herein.

FIG. 6 is a flowchart showing an illustrative method for laying out a pattern so that feature ends are not positioned within keep-out zones. According to certain illustrative examples, the method 600 includes a step for assigning 602 a keep-out zone to an end of a first feature within a target pattern. The method further includes a step for positioning 604 other features such that ends of the other features of the target pattern do not have an end within the keep-out zone. The target pattern is to be formed with a corresponding main feature and cut pattern.

According to certain illustrative examples, a method for laying out a target pattern includes assigning a keep-out zone to an end of a first feature within a target pattern, and positioning other features such that ends of the other features of the target pattern do not have an end within the keep-out zone. The target pattern is to be formed with a corresponding main pattern and cut pattern.

According to certain illustrative examples, a method for adjusting a layout design of a target pattern includes assigning a keep-out zone to an end of a first feature within a target pattern, the target pattern having a restricted design rule layout, determining that an end of another feature within the target pattern is within the keep-out zone, and modifying the target pattern such that no ends of other features are within the keep-out zone. The target pattern is to be formed with a corresponding main pattern and cut pattern.

According to certain illustrative examples, a computer system includes a processor and a memory. The memory includes a set of computer readable instructions that when executed by the processor, cause the system to assign a keep-out zone to an end of a first target feature within a target pattern, the target pattern having a restricted design rule layout, determine that an end of other target features within the target pattern is within the keep-out zone, and modify the target pattern such that no ends of other target features are within the keep-out zone. The target pattern is to be used with a corresponding main pattern and cut pattern.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method for adjusting a layout design of a target pattern, the method comprising:

assigning a keep-out zone to an end of a first feature within a target pattern, the target pattern having a restricted design rule layout;

determining, by using a computer, that an end of a second feature within the target pattern is within the keep-out zone; and modifying the target pattern such that the end of the second feature is not within the keep-out zone;

determining that an end of a third feature within the target pattern is within the keep-out zone; and modifying the target pattern such that the end of the third feature is not within the keep-out zone wherein the target pattern is to be formed with a corresponding main pattern and cut pattern.

2. The method of claim 1, further comprising:
laying out a cut pattern corresponding to the target pattern.

3. The method of claim 1, wherein the target pattern utilizes multiple patterning.

4. The method of claim 3, wherein the multiple patterning is one of: multiple patterning, self-aligned multiple patterning and directed self-assembly.

5. The method of claim 3, wherein determining that the end of the second feature within the target pattern is within the keep-out zone includes using a distance between a corner of the first feature and a corner of the second feature to determine whether the end of the second feature is within the keep-out zone.

6. The method of claim 1, wherein determining that the end of the second feature within the target pattern is within the keep-out zone includes using a distance between an edge of the first feature and an edge of the second feature to determine whether an end of the other target features is within the keep-out zone.

7. The method of claim 1, wherein the target pattern is one of: a one dimensional pattern and a two dimensional pattern.

8. A computer system comprising:
a processor; and
a memory comprising a set of computer readable instructions that when executed by the processor, cause the system to:
assign a keep-out zone to an end of a first target feature within a target pattern, the target pattern having a restricted design rule layout;
determine that an end of a second target features within the target pattern is within the keep-out zone; and
modify the target pattern such that no ends of the second target features are within the keep-out zone;
determining that an end of a third feature within the target pattern is within the keep-out zone; and
modifying the target pattern such that the end of the third feature is not within the keep-out zone,
wherein the target pattern is to be used with a corresponding main pattern and cut pattern.

9. The system of claim 8, wherein the computer readable instructions further cause the system to:
lay out the cut pattern that corresponds with the target pattern to form the final pattern.

10. The system of claim 8, wherein the computer readable instructions further cause the system to:
use a distance between a corner of the first target feature and a corner of the second target feature to determine whether the end of the second target feature is within the keep-out zone.

11. The system of claim 8, wherein the computer readable instructions further cause the system to:
use a distance between an edge of the first target feature and an edge of the second target feature to determine whether the end of the second target feature is within the keep-out zone.

12. The system of claim 8, wherein the target pattern is one of: a one dimensional pattern and a two dimensional pattern.

13. A method for modifying a layout design of a target pattern, the method comprising:
assigning a keep-out zone to an end of a first feature within the target pattern, the first feature including a first end, a first edge, and a first cut pattern;
upon a condition in which a second end of a second feature in the target pattern lies within the keep-out zone, positioning, by using a computer, the second feature in the target pattern such that the second end does not lie within the keep-out zone
upon a condition in which a third end of a third feature in the target pattern lies within the keep-out zone, positioning the third feature in the target pattern such that the third end does not lie within the keep-out zone.

14. The method of claim 13, wherein the target pattern utilizes one of:
multiple patterning, self-aligned multiple patterning, and directed self-assembly.

15. The method of claim 13, wherein positioning the second feature includes:
using a distance between a corner of the first end and a corner of the second end to determine whether the second end is within the keep-out zone.

16. The method of claim 13, wherein positioning the second features includes:
using a distance between the first edge and a second edge of the second target feature to determine whether the second end is within the keep-out zone.

17. The method of claim 13, wherein the keep-out zone is in a shape of one of: a square, a rectangle, a circle, and an ellipse.

18. The method of claim 13, wherein the target pattern is a restricted design rule layout.

19. The method of claim 13, wherein the target pattern is one of: a one dimensional pattern and a two dimensional pattern.

* * * * *